(12) United States Patent
Patten et al.

(10) Patent No.: US 9,400,203 B2
(45) Date of Patent: Jul. 26, 2016

(54) VIBRATORY FLOW METER AND ZERO CHECK METHOD

(75) Inventors: Andrew Timothy Patten, Boulder, CO (US); Paul J. Hays, Lafayette, CO (US); Stephanie A. Lane, Fort Collins, CO (US)

(73) Assignee: Micro Motion, Inc., Boulder, CO (US)

( * ) Notice: Subject to any disclaimer, the term of this patent is extended or adjusted under 35 U.S.C. 154(b) by 305 days.

(21) Appl. No.: 14/125,216

(22) PCT Filed: Jun. 27, 2011

(86) PCT No.: PCT/US2011/042032
§ 371 (c)(1),
(2), (4) Date: Dec. 10, 2013

(87) PCT Pub. No.: WO2013/002759
PCT Pub. Date: Jan. 3, 2013

(65) Prior Publication Data
US 2014/0137626 A1    May 22, 2014

(51) Int. Cl.
*G01F 25/00* (2006.01)
*G01F 1/84* (2006.01)

(52) U.S. Cl.
CPC .......... *G01F 25/0007* (2013.01); *G01F 1/8436* (2013.01); *G01F 1/8472* (2013.01)

(58) Field of Classification Search
CPC . G01D 18/008; G01F 1/8436; G01F 25/0007; G01F 1/8413; G01F 1/8486; G01F 1/74
See application file for complete search history.

(56) References Cited

U.S. PATENT DOCUMENTS

| | | | | |
|---|---|---|---|---|
| 5,228,327 A * | 7/1993 | Bruck | ............... | G01F 1/8413 702/45 |
| 5,602,346 A * | 2/1997 | Kitami | ............... | G01F 1/8431 73/861.356 |
| 7,124,646 B2 * | 10/2006 | Henry | ............... | G01F 1/74 73/861.356 |
| 7,194,368 B2 * | 3/2007 | Stack | ............... | G01F 1/8413 702/100 |
| 7,275,007 B2 * | 9/2007 | Lesjak | ............... | G01D 18/008 702/87 |
| 7,337,084 B2 * | 2/2008 | Dutton | ............... | G01F 1/8436 702/100 |
| 8,855,958 B2 * | 10/2014 | Wang | ............... | G01F 1/8436 702/100 |
| 2004/0200259 A1 | 10/2004 | Mattar | | |
| 2005/0119845 A1 | 6/2005 | Lesjak | | |
| 2006/0287839 A1 | 12/2006 | Dutton | | |

FOREIGN PATENT DOCUMENTS

| | | |
|---|---|---|
| CN | 1068420 A | 1/1993 |
| JP | 2006112796 A | 4/2006 |
| JP | 2010203776 | 9/2010 |
| WO | 9301472 A1 | 1/1993 |
| WO | 2011019345 A1 | 2/2011 |

* cited by examiner

*Primary Examiner* — David A Rogers
(74) *Attorney, Agent, or Firm* — The Ollila Law Group LLC

(57) ABSTRACT

A vibratory flow meter (5, 300) is provided. The vibratory flow meter (5, 300) includes a flow meter assembly (10, 310) including at least two vibration sensors (170L and 170R, 303 and 305) that generate at least two vibrational signals and meter electronics (20, 320) that receives the at least two vibrational signals, generate a new time difference ($\Delta t$) using multiple time difference measurements obtained for a flow material, and determine if the new time difference ($\Delta t$) is within predetermined bounds of an old time difference ($\Delta t_0$).

20 Claims, 3 Drawing Sheets

VIBRATORY FLOW METER AND ZERO CHECK METHOD

BACKGROUND OF THE INVENTION

1. Field of the Invention

The present invention relates to a vibratory flow meter and zero check method.

2. Statement of the Problem

Vibrating conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flowmeter includes one or more conduits that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation. The instrumentation receives signals from the two pickoff sensors and processes the signals in order to derive a mass flow rate measurement, among other things.

When there is no flow through the flow meter, all points along the conduit oscillate due to an applied driver force with identical phase or a small initial fixed phase offset which can be corrected. As material begins to flow, Coriolis forces cause each point along the conduit to have a different phase. The phase on the inlet side of the conduit lags the driver, while the phase on the outlet side of the conduit leads the driver. Pickoff sensors coupled to the conduit(s) to produce sinusoidal signals representative of the motion of the conduit(s). Signals output from the pickoff sensors are processed to determine the phase difference between the pickoff sensors. The phase difference between two pickoff sensor signals is proportional to the mass flow rate of material through the conduit(s).

Coriolis mass flow meters calculate mass flow rate from a time delay measurement where time delay arises from the Coriolis effect and is directly proportionally to the mass flow rate. For an ideal Coriolis mass flow meter (one that is completely symmetric from its inlet to its outlet and is undamped) measuring time delay is all that is needed to accurately determine mass flow rate. However, Coriolis mass flow meters are inevitably non-symmetric and are subject to structural and viscous damping. As a result, under no flow conditions a small amount of time delay may be present. This time delay is measured and subtracted from the time delay induced by the Coriolis effect to obtain a zero time delay.

It is a problem that the time delay of a Coriolis flow meter at zero flow may change over time. Changes in the zero-flow time difference can result in an erroneous flow rate measurement.

Coriolis flow meters often require zeroing, such as during an initial calibration, during operation, or both. Zeroing a Coriolis mass flow meter at the factory comprises filling the meter with a desired, known flow material under strictly controlled conditions, establishing zero flow of the flow material, making sure that the fluid is stable, such as ensuring that there are no entrained gases in the flow material if the flow material is a liquid, vibrating the meter assembly and taking a number of samples and obtaining multiple zero-flow time difference values, calculating an average zero-flow time difference (or other representative time difference value), and storing a calibration zero-flow time difference ($\Delta t_0$) in the Coriolis mass flow meter.

In operation, the zero-flow time difference ($\Delta t_0$) may be used in the Coriolis flow meter for generating mass flow measurements. Mass flow is determined as:

$$\text{mass flow} = FCF^*(\Delta t - \Delta t_0) \qquad (1)$$

The FCF term is a flow calibration factor representative of physical characteristics of the flow meter. The ($\Delta t$) term is the current, measured time difference between pickoff signals. The ($\Delta t_0$) term is the stored zero-flow time difference calibration value. The ($\Delta t$) term comprises a measurement signal that is generated during operation of a Coriolis flow meter.

In the prior art, a zero-flow calibration may be initiated in an operational environment by a user. One drawback in the prior art is that such a user-initiated zero-flow calibration process may be done whether it is needed or not. A previously generated and stored zero-flow time difference ($\Delta t_0$) value may be accurate enough to generate good measurement values.

Another drawback in the prior art is that during a zeroing operation in the field, it may not be possible to strictly control all environmental conditions. The fluid in the meter to be zeroed will generally not be a calibration fluid provided just for the operation. Problems with the fluid, such as entrained gas in a liquid flow material, may disturb the time difference ($\Delta t$) readings so that the calculated zero-flow time difference ($\Delta t_0$) is not representative of the true average. As a result, the meter may be zeroed incorrectly, introducing errors.

Yet another drawback is that the user performs a zeroing process without knowing whether the current zero-flow time difference is accurate or inaccurate. Re-zeroing a flow meter when it has an accurate zero-flow time difference could result in a new zero-flow time difference value that is similar to or even less accurate than the previous value.

Yet another drawback in the prior art is that the user is left to assume that the newly-produced zero value is accurate (and more accurate than the previous value). To assess accuracy of ($\Delta t_0$), flow meter users often zero the meter multiple times and compare the produced ($\Delta t_0$) values. This is cumbersome, expensive, and time consuming, and puts too much expectation on flow meter users to understand how the zeroing process works.

ASPECTS OF THE INVENTION

In one aspect of the invention, a vibratory flow meter comprises:
  a flow meter assembly including at least two vibration sensors that generate at least two vibrational signals; and
  meter electronics that receives the at least two vibrational signals and generate a new time difference ($\Delta t$) using multiple time difference measurements obtained for a flow material and determine if the new time difference ($\Delta t$) is within predetermined bounds of an old time difference ($\Delta t_0$).

Preferably, further comprising the meter electronics being configured to prompt a user of the vibratory flow meter about replacing the old time difference ($\Delta t_0$) if the new time difference ($\Delta t$) is not within predetermined bounds of the old time difference ($\Delta t_0$) and replace the old time difference ($\Delta t_0$) with the new time difference ($\Delta t$) if the user selects replacement.

Preferably, further comprising the meter electronics being configured to indicate one or both of the new time difference ($\Delta t$) or the old time difference ($\Delta t_0$) to the user.

Preferably, the old time difference ($\Delta t_0$) comprises a factory-derived zero-flow value.

Preferably, the old time difference ($\Delta t_0$) comprises an operationally-derived zero-flow value.

Preferably, further comprising the meter electronics being configured to determine if the multiple time difference measurements are substantially stable and prompting the user only if the new time difference ($\Delta t$) is not within predetermined bounds of the old time difference ($\Delta t_0$) and if the multiple time difference measurements are substantially stable.

Preferably, further comprising the meter electronics being configured to determine if the flow material is substantially stable and prompt the user only if the new time difference ($\Delta t$) is not within predetermined bounds of the old time difference ($\Delta t_0$) and if the flow material is substantially stable.

Preferably, further comprising the meter electronics being configured to compare one or more selected drive power, drive gain, flow material pressure, flow material temperature, or flow material density values to corresponding reference values, and determine that the flow material is substantially stable if the one or more selected drive power, drive gain, flow material pressure, flow material temperature, or flow material density values fall within predetermined tolerance ranges of the corresponding reference values, wherein the user is prompted only if the new time difference ($\Delta t$) is not within predetermined bounds of the old time difference ($\Delta t_0$) and if the flow material is substantially stable.

In one aspect of the invention, a zero check method in a vibratory flow meter comprises:
  generating a new time difference ($\Delta t$) using multiple time difference measurements obtained for a flow material; and
  determining if the new time difference ($\Delta t$) is within predetermined bounds of an old time difference ($\Delta t_0$).

Preferably, further comprising prompting a user of the vibratory flow meter about replacing the old time difference ($\Delta t_0$) if the new time difference ($\Delta t$) is not within predetermined bounds of the old time difference ($\Delta t_0$) and replacing the old time difference ($\Delta t_0$) with the new time difference ($\Delta t$) if the user selects replacement.

Preferably, further comprising indicating one or both of the new time difference ($\Delta t$) or the old time difference ($\Delta t_0$) to the user.

Preferably, the old time difference ($\Delta t_0$) comprises a factory-derived zero-flow value.

Preferably, the old time difference ($\Delta t_0$) comprises an operationally-derived zero-flow value.

Preferably, further comprising determining if the multiple time difference measurements are substantially stable and prompting the user only if the new time difference ($\Delta t$) is not within predetermined bounds of the old time difference ($\Delta t_0$) and if the multiple time difference measurements are substantially stable.

Preferably, further comprising determining if the flow material is substantially stable and prompting the user only if the new time difference ($\Delta t$) is not within predetermined bounds of the old time difference ($\Delta t_0$) and if the flow material is substantially stable.

Preferably, determining if the flow material is substantially stable further comprises comparing one or more selected drive power, drive gain, flow material pressure, flow material temperature, or flow material density values to corresponding reference values, and determining that the flow material is substantially stable if the one or more selected drive power, drive gain, flow material pressure, flow material temperature, or flow material density values fall within predetermined tolerance ranges of the corresponding reference values, wherein the user is prompted only if the new time difference ($\Delta t$) is not within predetermined bounds of the old time difference ($\Delta t_0$) and if the flow material is substantially stable.

DESCRIPTION OF THE DRAWINGS

The same reference number represents the same element on all drawings. The drawings are not necessarily to scale.

DETAILED DESCRIPTION OF THE INVENTION

Figure 1:
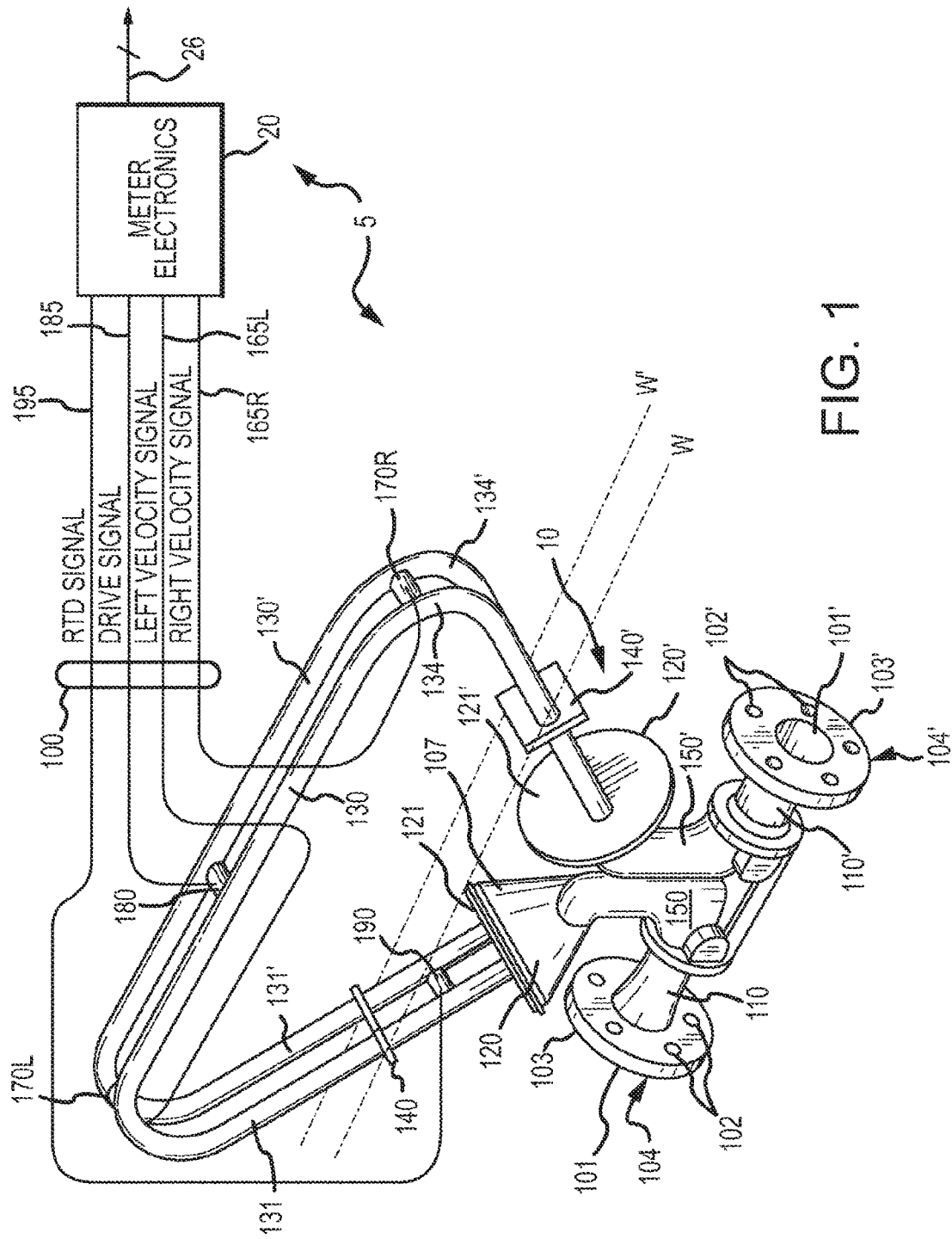
FIG. 1 shows a Coriolis flow meter comprising a meter assembly and meter electronics.
Figure 2:
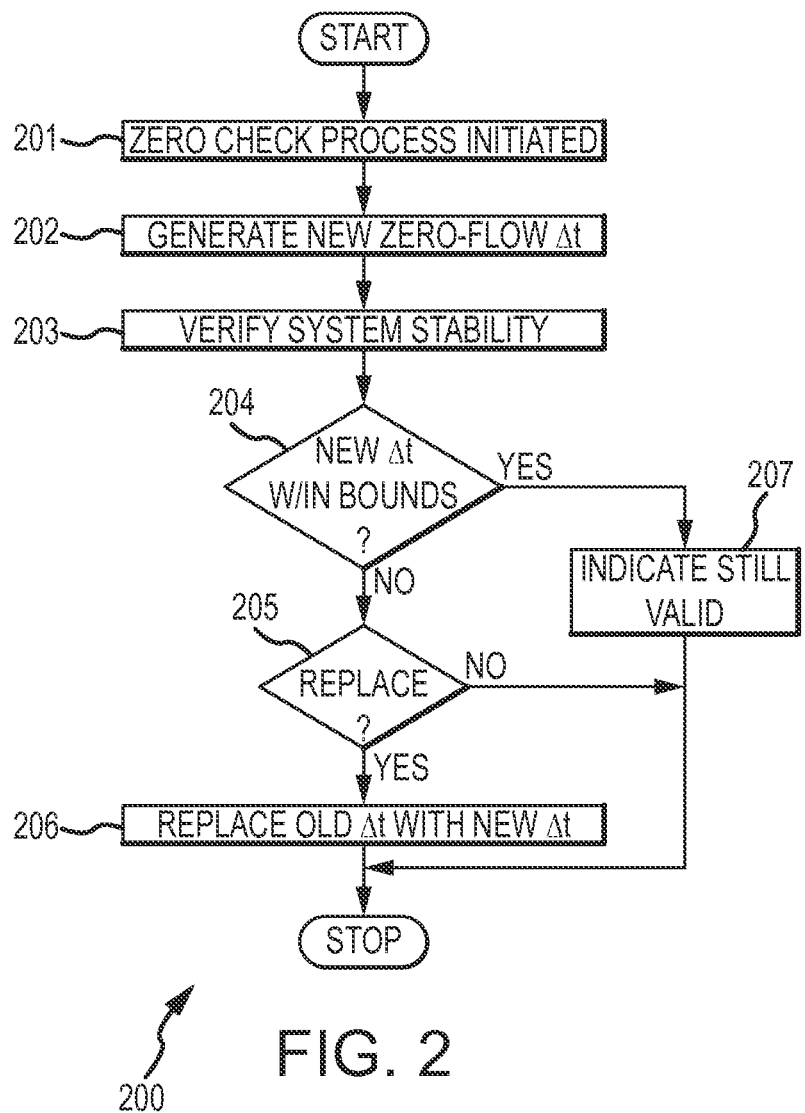
FIG. 2 is a flowchart of a time difference zero check method according to embodiments of the invention.
Figure 3:
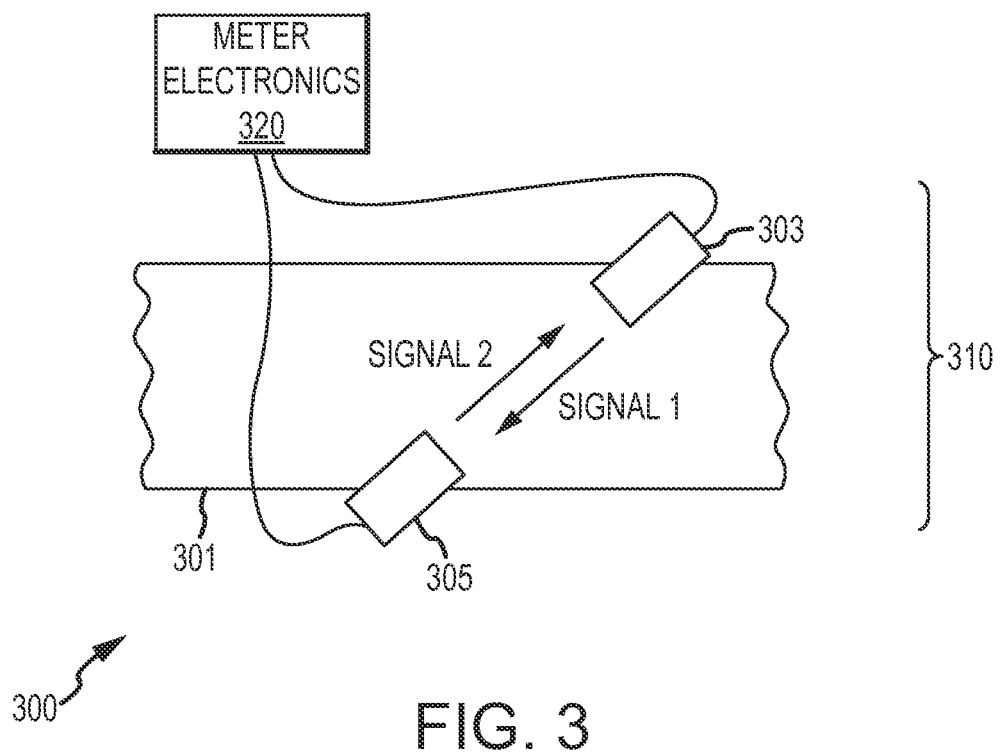
FIG. 3 shows an ultrasonic flow meter according to embodiments of the invention.

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 shows a Coriolis flow meter 5 comprising a meter assembly 10 and meter electronics 20. Meter assembly 10 responds to mass flow rate and density of a process material. Meter electronics 20 is connected to meter assembly 10 via leads 100 to provide density, mass flow rate, and temperature information over path 26, as well as other information not relevant to the present invention. A Coriolis flow meter structure is described although it is apparent to those skilled in the art that the present invention could be practiced as a vibrating tube densitometer without the additional measurement capability provided by a Coriolis mass flow meter.

Meter assembly 10 includes a pair of manifolds 150 and 150', flanges 103 and 103' having flange necks 110 and 110', a pair of parallel flow tubes 130 and 130', drive mechanism 180, temperature sensor 190, and a pair of velocity sensors 170L and 170R (i.e., vibration sensors). Flow tubes 130 and 130' have two essentially straight inlet legs 131 and 131' and outlet legs 134 and 134' which converge towards each other at flow tube mounting blocks 120 and 120'. Flow tubes 130 and 130' bend at two symmetrical locations along their length and are essentially parallel throughout their length. Brace bars 140 and 140' serve to define the axis W and W' about which each flow tube oscillates.

The side legs 131, 131' and 134, 134' of flow tubes 130 and 130' are fixedly attached to flow tube mounting blocks 120 and 120' and these blocks, in turn, are fixedly attached to manifolds 150 and 150'. This provides a continuous closed material path through Coriolis meter assembly 10.

When flanges 103 and 103', having holes 102 and 102' are connected, via inlet end 104 and outlet end 104' into a process line (not shown) which carries the process material that is being measured, material enters end 104 of the meter through an orifice 101 in flange 103 is conducted through manifold 150 to flow tube mounting block 120 having a surface 121. Within manifold 150 the material is divided and routed through flow tubes 130 and 130'. Upon exiting flow tubes 130 and 130', the process material is recombined in a single stream within manifold 150' and is thereafter routed to exit end 104' connected by flange 103' having bolt holes 102' to the process line (not shown).

Flow tubes 130 and 130' are selected and appropriately mounted to the flow tube mounting blocks 120 and 120' so as to have substantially the same mass distribution, moments of inertia and Young's modulus about bending axes W—W and W'—W', respectively. These bending axes go through brace bars 140 and 140'. Inasmuch as the Young's modulus of the flow tubes change with temperature, and this change affects the calculation of flow and density, resistive temperature detector (RTD) 190 is mounted to flow tube 130', to continuously measure the temperature of the flow tube. The temperature of the flow tube and hence the voltage appearing across the RTD for a given current passing therethrough is governed by the temperature of the material passing through the flow tube. The temperature dependent voltage appearing across the RTD is used in a well-known method by meter electronics 20 to compensate for the change in elastic modulus of flow tubes 130 and 130' due to any changes in flow tube temperature. The RTD is connected to meter electronics 20 by lead 195.

Both flow tubes 130 and 130' are driven by driver 180 in opposite directions about their respective bending axes W and W' and at what is termed the first out-of-phase bending mode of the flow meter. This drive mechanism 180 may comprise any one of many well-known arrangements, such as a magnet mounted to flow tube 130' and an opposing coil mounted to flow tube 130 and through which an alternating current is passed for vibrating both flow tubes. A suitable drive signal is applied by meter electronics 20, via lead 185, to drive mechanism 180.

Meter electronics 20 receives the RTD temperature signal on lead 195, and the left and right velocity signals appearing on leads 165L and 165R, respectively. Meter electronics 20 produces the drive signal appearing on lead 185 to drive element 180 and vibrate tubes 130 and 130'. Meter electronics 20 processes the left and right velocity signals and the RTD signal to compute the mass flow rate and the density of the material passing through meter assembly 10. This information, along with other information, is applied by meter electronics 20 over path 26 to utilization means 29.

In some embodiments, the meter electronics 20 is configured to receive at least two vibrational signals and generate a new time difference ($\Delta t$) using multiple time difference measurements obtained for a flow material, determine if the new time difference ($\Delta t$) is within predetermined bounds of an old time difference ($\Delta t_0$), prompt a user of the Coriolis flow meter 5 about replacing the old time difference ($\Delta t_0$) if the new time difference ($\Delta t$) is not within predetermined bounds of the old time difference ($\Delta t_0$), and replace the old time difference ($\Delta t_0$) with the new time difference ($\Delta t$) if the user selects replacement.

Consequently, the Coriolis flow meter 5, and/or the meter electronics 20 is capable of performing a zero check. Further, the Coriolis flow meter 5/meter electronics 20 may perform a zero check followed by a zero calibration. The zero calibration is not mandatory or automatic. Instead, the zero calibration is only permitted under certain conditions. The user of the Coriolis flow meter 5 is prompted about performing a zero calibration if the conditions are met, such as the zero check finding that a current zero-flow time difference value is not valid.

It should be understood that the user is presented with an option to perform a zero calibration after the zero check has been performed. The user may wish to only perform the zero check and not the zero calibration. The user may perform the zero check in order to verify proper operation of the Coriolis flow meter 5 and/or to verify the condition of the flow material.

FIG. 2 is a flowchart 200 of a time difference zero check method according to embodiments of the invention. In step 201, the zero check process is initiated. The zero check process may perform a check on the zero-flow time difference ($\Delta t_0$) of a vibratory flow meter. If the zero-flow time difference ($\Delta t_0$) is invalid, any mass flow rate measurements generated by the vibratory mass flow meter will be inaccurate. The vibratory flow meter may comprise a meter that generates vibrational responses in order to make flow measurements, such as flow rate measurements and mass flow rate measurements, for example. The vibratory flow meter may comprise an ultrasonic flow meter or a Coriolis flow meter, for example.

The zero check may be initiated by a user in some embodiments. Alternatively, the zero check may be initiated by other fault processes or verification routines. The zero check may be autonomously initiated upon expiration of a predetermined time period. Other initiating events or factors are contemplated and are within the scope of the description and claims.

In some embodiments, the user may be presented with instructions for properly setting up and initiating the zero check process. The instructions may direct that a process fluid be flowed through the flow meter until the flow meter temperature stabilizes, under normal operating conditions. The instructions may direct that the flow meter be completely full of fluid. The instructions may direct that valves be closed on both sides of the flow meter to block the fluid inside the flow meter, wherein no flow may occur. The instructions may finally direct that the user select a zero check input after the above steps have been taken.

In step 202, a new and representative time difference ($\Delta t$) is generated from multiple time difference measurements. The multiple time difference measurements are obtained with a known flow material in the flow meter and under no-flow conditions. A predetermined number of multiple time difference measurements may be obtained. Although there is no minimum required number of time difference measurements, it should be understood that a greater number of time difference measurements may result in greater stability and will generate a time difference that is more representative of the particular vibratory flow meter.

The new time difference ($\Delta t$) can be generated in any suitable manner. The representative time difference ($\Delta t$) can be generated through suitable mathematical or statistical processing of the multiple time difference measurements, for example. In one embodiment, the new time difference ($\Delta t$) comprises an average or mean of the accumulated time difference measurements. In addition, a standard deviation (S) of the multiple time difference measurements may be calculated. However, other processes for generating a representative new time difference ($\Delta t$) are contemplated and are within the scope of the description and claims.

The new time difference (Δt) may be temporarily stored, such as for additional processing or use. The new time difference (Δt) may be logged as part of a verification log. The new time difference (Δt) may be displayed or otherwise transmitted to the user.

In order to effectively assess stability of the fluid, a reference may be constructed of measurements and/or values that are obtained during normal operational conditions. New values obtained as part of a re-zeroing operation may be compared to the reference variables during the re-zeroing procedure in order to assess fluid stability.

In addition, while time difference measurements are being acquired for generating the new time difference (Δt), other measurements or values may be accumulated. The accumulated values may include a drive power, drive gain, fluid density, fluid temperature, and/or fluid pressure, for example. Other flow meter values are contemplated and are within the scope of the description and claims. One or more of these additional values may be used to subsequently determine fluid stability, as discussed below. In some embodiments, the measurements or values are periodically sampled. In other embodiments, the measurements or values are added to running averages. It should be understood that in other embodiments the representative values may comprise averages of sampled values. These representative values are then used for comparison during stability testing.

In step 203, the stability of the flow meter system may be verified. The system stability verification can include determining if the time difference measurements are stable. For example, if some of the time difference measurements vary excessively, the flow meter system may not be sufficiently stable for performing a zero check process. The stability of the new time difference (Δt) may be determined from the processing of the multiple time difference measurements. The new time difference (Δt) may not be stable for purposes of verifying the zero-flow time difference.

The stability of the fluid flow material may alternatively (or additionally) be verified in step 203. In some embodiments, measured values of drive power, drive gain, fluid temperature, fluid pressure, and fluid density, alone or in various combinations, may be used for determining the relative stability of the fluid. These factors or measurements may be processed to determine whether they fall within predetermined bounds and are therefore substantially stable for purposes of analyzing the flow material.

In one embodiment, drive power or drive gain and measured density are analyzed to determine fluid stability. In a multi-phase flow, such as where air or gas bubbles are entrained in liquid, the fluid density and the drive power will vary as the void fraction varies, indicating that the fluid is too unstable to be used for a zero check process. If the drive power/gain and measured density fall outside of predetermined bounds for the flow material, then the flow material is determined to be unstable for purposes of a zero check process.

The stability of the fluid may comprise a fluid having a stable composition. The stability of the fluid may comprise a fluid having a stable density. The stability of the fluid may comprise a fluid having a stable pressure. The stability of the fluid may comprise a fluid having a stable temperature. The stability of the fluid may comprise a fluid having a single phase. The stability of the fluid may comprise a fluid having multiple phases but stable in proportions of the fluid components.

A lack of flow material stability may be indicated in any suitable fashion, including storing values, measurements, and/or results of the flow material stability check. In addition, the lack of flow material stability may be communicated to the user. The lack of flow material stability can comprise one or more of: the occurrence of flow in the flow meter, the presence of a multiphase fluid flow material, an unacceptable fluid temperature, and unacceptable fluid pressure, and/or an unacceptable fluid density. Additional stability factors/problems are contemplated and are within the scope of the description and claims.

In step 204, the new time difference (Δt) is compared to the currently stored (i.e., old) zero-flow time difference ($\Delta t_0$). In some embodiments, the comparison includes comparing an average and a standard distribution of the multiple time difference measurements to the old time difference ($\Delta t_0$). If the new time difference (Δt) is not within the predetermined bounds of the old time difference ($\Delta t_0$), then the old time difference ($\Delta t_0$) is determined to no longer be valid and the method proceeds to step 205. Otherwise, if the new time difference (Δt) is within predetermined bounds, then the old time difference ($\Delta t_0$) is still valid and the method branches to step 207. The method therefore branches to step 207 if the new time difference (Δt) is substantially similar to the old time difference ($\Delta t_0$) and the zero-flow calibration value of the vibratory flow meter has not appreciably changed since a previous time difference calibration.

The predetermined bounds may be determined in any manner. In one embodiment, the predetermined bounds may comprise a predetermined tolerance range above and below the old time difference ($\Delta t_0$).

In another embodiment, the predetermined bounds may comprise a confidence interval formed from the old time difference ($\Delta t_0$). For example, noise is known and expected in any electronic signal. The noise can be assumed to be randomly distributed. Therefore, in one embodiment of the predetermined bounds, the predetermined bounds comprises essentially the old time difference ($\Delta t_0$) minus a noise quantity (n) as a lower bound and the old time difference ($\Delta t_0$) plus the noise quantity (n) as an upper bound. This assumes that the noise (n) is substantially randomly distributed. As a result, the true average of the data, i.e., the new time difference (Δt), can be found as:

$$\text{new } \Delta t = \Delta t_0 \pm 2S/\sqrt{n} \qquad (2)$$

This may produce, for example, a 95% confidence interval, where the (new Δt) term is the representative new time difference generated from the multiple time difference measurements. The (S) term comprises the standard deviation, such as the standard deviation for the multiple time difference measurements generated in step 202. The (n) term is the number of samples, i.e., the number of measurements in the multiple time difference measurements.

If the new time difference (Δt) falls within the predetermined bounds, then the new time difference (Δt) is determined to be essentially unchanged from the old time difference ($\Delta t_0$). However, if the new time difference (Δt) falls outside the predetermined bounds, then the new time difference (Δt) is determined to be sufficiently different from the old time difference ($\Delta t_0$). Therefore, it can be determined that the old time difference ($\Delta t_0$) is no longer accurate enough to be used for generating measurements.

A 95% confidence interval is given only as an example. The confidence interval may encompass any desired range. It should be understood that other confidence intervals may be used and are within the scope of the description and claims.

The comparison of the new time difference (Δt) to the old time difference ($\Delta t_0$) may comprise any manner of comparison. In one embodiment, a t-test may be used to compare the new time difference (Δt) to the old time difference ($\Delta t_0$). In general terms, a t-test comprises a statistical test in which the test statistic has a t distribution. The t-test may test for changes in the average when generating the new time difference ($\Delta t$) from the multiple time difference measurements. The t-test may be calculated as:

$$t = ((\Delta t_0) - (stab))/(S/\sqrt{n}) \quad (3)$$

The result, (t) comprises a real number that represents the relationship (i.e., a difference or offset) between the new time difference ($\Delta t$) and the old time difference ($\Delta t_0$). The ($\Delta t_0$) term is the old time difference. The (stab) term comprises a predetermined zero-stability value for the particular flow meter, wherein the predetermined zero-stability value may be model-specific and/or size specific. The (S) term comprises the standard deviation. The (n) term is the number of samples.

If (t>2) or if (t<−2), then the distribution of the new $\Delta t$ is outside of the range given by the (stab) term. In this example, the (2, −2) range gives a 95% confidence limit.

Alternatively, the comparison of the new time difference ($\Delta t$) to the old time difference ($\Delta t_0$) may comprise an F test. An F-test comprises a statistical test in which the test statistic has an F distribution.

The comparison may comprise a comparison where the old time difference ($\Delta t_0$) comprises a factory-derived zero-flow value, such as where the particular meter is calibrated in a test stand and under carefully controlled conditions. If the new time difference ($\Delta t$) differs significantly from the old time difference ($\Delta t_0$), such as where the t-test fails, a software flag, visual indicator, or other indication may be generated in order to alert the user that the flow meter should not be re-zeroed.

Alternatively, the comparison may comprise a comparison to a field-derived (i.e., operationally-obtained) old zero-flow value. In this circumstance, the old time difference ($\Delta t_0$) may comprise a zero-flow test that was performed while the particular flow meter was operationally installed, with the new time difference ($\Delta t$) also being performed while installed to some manner of operational environment. A test failure here may be handled differently from a difference from a factory calibration value. For instance, a density change between the current zero operation and a previous zero operation may be a real and expected fluid change. By tracking the data in this way, the user can be alerted to the difference in process conditions to help explain changes to the zero-flow time difference calibration value. As a result, the user can make an informed decision whether to re-zero (or not re-zero) the flow meter.

The factory-derived zero-flow value may comprise a more trusted value than an operationally-derived zero-flow value. Replacement of the old time difference ($\Delta t_0$) may comprise a more significant and risky change if the old time difference ($\Delta t_0$) is the factory-derived zero-flow value. Consequently, in some embodiments an indication may be provided to the user that the old time difference ($\Delta t_0$) comprises the factory-derived zero-flow value.

The predetermined bounds for the factory-derived zero-flow value in some embodiments may differ from the predetermined bounds for the operationally-derived zero-flow value. Alternatively, the predetermined bounds for a factory-derived zero-flow value may be the same as for an operationally-derived zero-flow value.

The factory-derived zero-flow value may be permanently stored in some embodiments, and may be available even after the old time difference ($\Delta t_0$) has been replaced one or more times through the zero check process. Consequently, in some embodiments the comparison performed in step 204 may comprise a comparison of the new time difference ($\Delta t$) to both the old time difference ($\Delta t_0$) (i.e., a current operationally-derived zero-flow value) and the factory-derived zero-flow value. A replacement decision can subsequently depend on the comparison to these two values. A replacement decision in this embodiment can require that the new time difference ($\Delta t$) be out of predetermined bounds with respect to the old time difference ($\Delta t_0$) and be out of predetermined bounds with respect to the factory-derived zero-flow value. It should be understood that the two predetermined bounds may be the same or different.

In step 205, where the old time difference ($\Delta t_0$) is determined to no longer be valid, the user is prompted as to whether the user wants to replace the old time difference ($\Delta t_0$) with the new time difference ($\Delta t$).

In step 206, if the user selects replacement, the new time difference ($\Delta t$) is stored in place of the old time difference ($\Delta t_0$). The zero-flow time difference calibration value is therefore updated. An indication of the successful replacement of the old time difference may be generated.

If the user does not select replacement, the new time difference ($\Delta t$) is not used. However, the user will be made aware that the old time difference ($\Delta t_0$) is no longer accurate and valid.

In step 207, where the new time difference ($\Delta t$) is within predetermined bounds of the old time difference ($\Delta t_0$), then the old time difference ($\Delta t_0$) is determined to still be valid. The old time difference ($\Delta t_0$) is therefore retained and the new time difference ($\Delta t$) is not used. An indication of the successful validation of the old time difference ($\Delta t_0$) may be generated. In some embodiments, the indication may include an indication to the user that the zero check analysis indicates that the old time difference ($\Delta t_0$) is still valid. In some embodiments, the indication may include an indication to the user that the zero check analysis indicates that a new zero calibration is not needed (or desirable). This is advantageous in that the user can find out if the old time difference ($\Delta t_0$) is still valid. The user can find out if the old time difference ($\Delta t_0$) is still valid, and without having to automatically replace the old time difference ($\Delta t_0$) with a new time difference ($\Delta t$). The user may just want verification that the old time difference ($\Delta t_0$) is still accurate and useful.

The zero check method presents a user with the ability to validate the currently stored and used zero-flow time difference calibration value ($\Delta t_0$). The zero check method presents a user with the ability to validate the currently stored and used zero-flow time difference calibration value ($\Delta t_0$) without having to automatically replace the calibration value ($\Delta t_0$). The zero check method presents a user with the ability to validate the currently stored and used zero-flow time difference calibration value ($\Delta t_0$) while also determining whether the time difference measurements and/or the flow material are stable, preventing time difference generation and replacement under non-acceptable conditions.

The zero check method determines if a zero calibration is needed. The zero check method determines if a zero calibration is possible. The zero check method determines if a zero calibration can be done accurately and reliably.

The zero check method may determine if a currently stored and used (i.e., old) time difference ($\Delta t_0$) is accurate. The zero check method generates an indication whether the old time difference ($\Delta t_0$) is acceptable or whether the old time difference ($\Delta t_0$) should be replaced.

The zero check method determines if newly obtained time difference measurements are stable enough for generating a new zero-flow time difference calibration value. The zero check method determines if the flow material is stable enough for generating a new zero-flow time difference calibration value.

The zero check method presents a user with the option of replacing the currently stored and used old time difference ($\Delta t_0$) with a new value if the newly obtained time difference measurements and the flow material are stable.

Replacement of an old time difference ($\Delta t_0$) may interfere with traceability of flow meter measurement values. Replacement of an old time difference ($\Delta t_0$) may interfere with traceability of flow meter calibration values. Replacement of a valid old time difference ($\Delta t_0$) may cause changes in generated mass flow measurements. Replacement of a valid old time difference ($\Delta t_0$) may cause changes in generated mass flow measurements where a flow material is unchanged. As a result, it is desirable that the old time difference ($\Delta t_0$) only be replaced when necessary.

FIG. 3 shows an ultrasonic flow meter 300 according to embodiments of the invention. The ultrasonic flow meter 300 comprises a vibratory flow meter, where the generated signals are treated in a similar manner as in the Coriolis flow meter 5 discussed above. The ultrasonic flow meter 300, instead of vibrating a flow conduit filled with a flow material, transmits acoustic waves directly into the flow material and receives acoustic waves that travel through the flow material.

The ultrasonic flow meter 300 comprises a meter electronics 320 coupled to a flow meter assembly 310. The flow meter assembly 310 includes a conduit 301, a first transducer 303, and a second transducer 305. The conduit 301 can contain a flowing or non-flowing fluid, with the fluid including gases, liquids, or mixtures of gases, liquids, and/or solids. The meter electronics 320 generates vibrational signals and provides the vibrational signals to the transducers 303 and 305. The transducers 303 and 305 comprise vibration sensors that may operate as both acoustic wave transmitters and acoustic wave sensors. The transducers 303 and 305 can subsequently generate acoustic waves in the flow material according to the vibrational signals (i.e., signal 1 and signal 2 in the figure), including ultrasonic acoustic waves. The transducers 303 and 305 do not directly vibrate the conduit 301. In addition, the transducers 303 and 305 can receive acoustic waves present in the flow material and generate electronic vibrational signals that are representative of the received acoustic/vibrational waves. The meter electronics 320 receives these resulting vibrational signals from the transducers 303 and 305 and generates flow measurements therefrom. The transmitted and received acoustic waves can be processed to determine a time difference value ($\Delta t$) that comprises a transit time through the flow material, in contrast to the time difference of the Coriolis flow meter 5, which comprises simultaneously received signals generated at physically spaced-apart locations.

The signal path between the transducers 303 and 305 is angled and not perpendicular across the conduit 301 and the flow therein. As a result, when there is flow in the conduit 301, the signal that is going generally with the flow will have a different transit time than the signal going generally against the flow. The difference in transit times, i.e., a $\Delta t$ difference, can be used to determine a flow velocity of the flow.

When there is no flow, then the transit times of the signals in both directions should be equal. However, due to inherent differences, such as differing tolerances and/or different electrical impedances, surface areas, wiring lengths, or transducer material compositions, for example, the signal 1 and signal 2 transit times may not be equal. Consequently, a zero-flow time difference calibration value $\Delta t_0$ may be generated and stored, where in the calibration value $\Delta t_0$ is added to or subtracted from one of the two signals to create substantially identical transit times in signal 1 and signal 2 under no-flow conditions. The calibration value $\Delta t_0$ may also be used under flow conditions in order to compensate for the inherent differences/offsets in the components of the ultrasonic flow meter 300.

As in the previously described Coriolis flow meter, this zero flow calibration value can be represented as ($\Delta t_0$) and can change or drift over the life of the ultrasonic flow meter 300. Therefore, the zero check method can be performed in the ultrasonic flow meter 300. Any or all of the steps 301-207 of the flowchart 200 may be applied to the ultrasonic flow meter 300.

The vibratory flow meter and method according to any of the embodiments may provide several advantages, if desired. The vibratory flow meter and method enable a user to initiate a zero check process. The vibratory flow meter and method enable a user to initiate a zero check process in order to confirm that a zero-flow time difference value being used by the flow meter is still valid. The vibratory flow meter and method enable a user to initiate a zero check process in order to obtain an indication whether a zero-flow time difference value being used by the flow meter is valid or invalid.

The vibratory flow meter and method enable a user to initiate a zero check process and obtain confirmation that a zero-flow time difference value being used by the flow meter is valid without necessarily having to re-zero the meter.

The vibratory flow meter and method enable a user to initiate a zero check process and receive an indication that the time difference measurements are stable or unstable. The vibratory flow meter and method enable a user to initiate a zero check process and receive an indication that the flow material is stable or unstable. The vibratory flow meter and method enable a user to initiate a zero check process wherein the process will not let the user re-zero the flow meter if either the time difference measurements or the flow material is unstable.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

What is claimed is:

1. A vibratory flow meter (5, 300), comprising:
   a flow meter assembly (10, 310) including at least two vibration sensors (170L and 170R, 303 and 305) that generate at least two vibrational signals; and
   meter electronics (20, 320) that receives the at least two vibrational signals and generate a new time difference ($\Delta t$) using multiple time difference measurements obtained for a flow material and determine if the new time difference ($\Delta t$) is within predetermined bounds of an old time difference ($\Delta t_0$), wherein the meter electronics (20, 320) are configured to determine if the multiple time difference measurements are substantially stable and prompting the user only if the new time difference ($\Delta t$) is not within predetermined bounds of the old time difference ($\Delta t_0$) and if the multiple time difference measurements are substantially stable.

2. The vibratory flow meter (5, 300) of claim 1, further comprising the meter electronics (20, 320) being configured to prompt a user of the vibratory flow meter (5, 300) about replacing the old time difference ($\Delta t_o$) if the new time difference ($\Delta t$) is not within predetermined bounds of the old time difference ($\Delta t_o$) and replace the old time difference ($\Delta t_o$) with the new time difference ($\Delta t$) if the user selects replacement.

3. The vibratory flow meter (5, 300) of claim 1, further comprising the meter electronics (20, 320) being configured to indicate one or both of the new time difference ($\Delta t$) or the old time difference ($\Delta t_o$) to the user.

4. The vibratory flow meter (5, 300) of claim 1, wherein the old time difference ($\Delta t_o$) comprises a factory-derived zero-flow value.

5. The vibratory flow meter (5, 300) of claim 1, wherein the old time difference ($\Delta t_o$) comprises an operationally-derived zero-flow value.

6. The vibratory flow meter (5, 300) of claim 1, further comprising the meter electronics (20, 320) being configured to determine if the multiple time difference measurements are substantially stable and prompting the user only if the new time difference ($\Delta t$) is not within predetermined bounds of the old time difference ($\Delta t_o$) and if the multiple time difference measurements are substantially stable.

7. The vibratory flow meter (5, 300) of claim 1, further comprising the meter electronics (20, 320) being configured to determine if the flow material is substantially stable and prompt the user only if the new time difference ($\Delta t$) is not within predetermined bounds of the old time difference ($\Delta t_o$) and if the flow material is substantially stable.

8. The vibratory flow meter (5, 300) of claim 1, further comprising the meter electronics (20, 320) being configured to:
   compare one or more selected drive power, drive gain, flow material pressure, flow material temperature, or flow material density values to corresponding reference values; and
   determine that the flow material is substantially stable if the one or more selected drive power, drive gain, flow material pressure, flow material temperature, or flow material density values fall within predetermined tolerance ranges of the corresponding reference values;
   wherein the user is prompted only if the new time difference ($\Delta t$) is not within predetermined bounds of the old time difference ($\Delta t_o$) and if the flow material is substantially stable.

9. A zero check method in a vibratory flow meter, the method comprising:
   generating a new time difference ($\Delta t$) using multiple time difference measurements obtained for a flow material;
   determining if the new time difference ($\Delta t$) is within predetermined bounds of an old time difference ($\Delta t_o$); and
   determining if the multiple time difference measurements are substantially stable and prompting the user only if the new time difference ($\Delta t$) is not within predetermined bounds of the old time difference ($\Delta t_o$) and if the multiple time difference measurements are substantially stable.

10. The zero check method of claim 9, further comprising:
    prompting a user of the vibratory flow meter about replacing the old time difference ($\Delta t_o$) if the new time difference ($\Delta t$) is not within predetermined bounds of the old time difference ($\Delta t_o$); and
    replacing the old time difference ($\Delta t_o$) with the new time difference ($\Delta t$) if the user selects replacement.

11. The zero check method of claim 9, further comprising indicating one or both of the new time difference ($\Delta t$) or the old time difference ($\Delta t_o$) to the user.

12. The zero check method of claim 9, wherein the old time difference ($\Delta t_o$) comprises a factory-derived zero-flow value.

13. The zero check method of claim 9, wherein the old time difference ($\Delta t_o$) comprises an operationally-derived zero-flow value.

14. The zero check method of claim 9, further comprising determining if the multiple time difference measurements are substantially stable and prompting the user only if the new time difference ($\Delta t$) is not within predetermined bounds of the old time difference ($\Delta t_o$) and if the multiple time difference measurements are substantially stable.

15. The zero check method of claim 9, further comprising determining if the flow material is substantially stable and prompting the user only if the new time difference ($\Delta t$) is not within predetermined bounds of the old time difference ($\Delta t_o$) and if the flow material is substantially stable.

16. The zero check method of claim 9, with determining if the flow material is substantially stable further comprising:
    comparing one or more selected drive power, drive gain, flow material pressure, flow material temperature, or flow material density values to corresponding reference values; and
    determining that the flow material is substantially stable if the one or more selected drive power, drive gain, flow material pressure, flow material temperature, or flow material density values fall within predetermined tolerance ranges of the corresponding reference values;
    wherein the user is prompted only if the new time difference ($\Delta t$) is not within predetermined bounds of the old time difference ($\Delta t_o$) and if the flow material is substantially stable.

17. The zero check method in a vibratory flow meter, the method comprising:
    obtaining multiple time difference measurements from known flow materials in a flow meter under no-flow conditions;
    generating a new time difference ($\Delta t$) using the multiple time difference measurements in a mathematical or statistical process;
    verifying the stability of the fluid flow material;
    determining if the new time difference ($\Delta t$) falls within a predetermined bounds of an old time difference ($\Delta t_o$); and
    determining if the multiple time difference measurements are substantially stable and prompting the user only if the new time difference ($\Delta t$) is not within predetermined bounds of the old time difference ($\Delta t_o$) and if the multiple time difference measurements are substantially stable.

18. The zero check method of claim 17, further comprising determining if the multiple time difference measurements are substantially stable and prompting the user only if the new time difference ($\Delta t$) is not within predetermined bounds of the old time difference ($\Delta t_o$) and if the multiple time difference measurements are substantially stable.

19. The zero check method of claim 17, further comprising determining if the flow material is substantially stable and prompting the user only if the new time difference ($\Delta t$) is not within predetermined bounds of the old time difference ($\Delta t_o$) and if the flow material is substantially stable.

20. The zero check method of claim 17, with determining if the flow material is substantially stable further comprising:
    comparing one or more selected drive power, drive gain, flow material pressure, flow material temperature, or flow material density values to corresponding reference values; and
    determining that the flow material is substantially stable if the one or more selected drive power, drive gain, flow material density values fall within predetermined tolerance ranges of the corresponding reference values;

wherein the user is prompted only if the new time difference ($\Delta t$) is not within predetermined bounds of the old time difference ($\Delta t_0$) and if the flow material is substantially stable.

* * * * *